United States Patent Office 3,754,016
Patented Aug. 21, 1973

---

3,754,016
NOVEL CYCLOALKENONE ESTERS
Peter Oberhänsli, Kusnacht, Switzerland, assignor to Givaudan Corporation, Clifton, N.J.
No Drawing. Filed Mar. 4, 1970, Ser. No. 16,608
Claims priority, application Switzerland, Mar. 10, 1969, 3,607/69
Int. Cl. C07c 49/58, 69/74
U.S. Cl. 260—468 K            10 Claims

ABSTRACT OF THE DISCLOSURE

There are provided novel cycloalkenone esters and enol ethers having 5–6 carbon atoms in the ring, and methods of producing said compounds which are useful as synthetic intermediates in the preparation of valuable odorants of the jasmine group. The novel esters are prepared by reacting the corresponding enol ether with a malonic ester in an anhydrous alkaline reaction medium.

SUMMARY OF THE INVENTION

The present invention is concerned with new cycloalkenone esters of the general formula

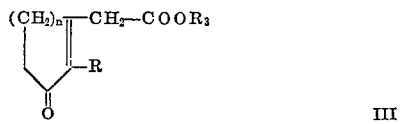

III wherein R is a hydrogen atom, lower alkyl, lower alkenyl or lower alkynyl, $R_3$ is lower alkyl and $n=1$ or 2.

These new cycloalkenone esters can be obtained in accordance with the invention by reacting an enol ether of the general formula

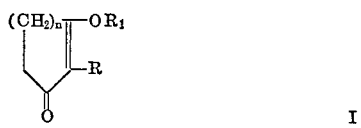

I wherein R and $n$ signify the same as above and $R_1$ is lower alkyl,
in alkaline, anhydrous reaction medium with a compound of the general formula

II wherein the radical $R_2$ signifies lower alkyl.

DESCRIPTION OF THE PREFERRED EMBODIMENTS

The expression "lower" as it is used in connection with alkyl, alkenyl and alkynyl relates especially to groups with up to 8 C-atoms. These groups can otherwise be straight-chain or branched. Examples of lower alkyl groups are: methyl, ethyl, propyl, isopropyl, n-butyl, isobutyl, tert, butyl, pentyl, hexyl, heptyl, octyl. Examples of lower alkenyl groups are: vinyl, allyl, methallyl, pentenyl, e.g. 2-pentenyl. Examples of lower alknyl groups are: ethynyl, propargyl, pentynyl, e.g. 2-pentynyl.

On practical grounds, lower alkyl groups as represented by the symbols $R_1$, $R_2$ and $R_3$ expediently contain 1–4 C-atoms.

The reaction of the enol ether of general Formula I with the compound of general Formula II is expediently effected in an organic solvent. Suitable as solvents are, for example, ethers such as dialkyl ethers or cyclic ethers (e.g. tetrahydrofuran or dioxan). Particularly suitable are alcohols and, in turn, among these those of the general formula $R_3OH$, $R_3$ having the above significance (thus, for example, methanol or ethanol). The use of alcohols as solvents is particularly expedient for the reason that alkaline-reacting reaction media may be produced in a simple manner from alcohols by alcoholate formation. Thus, by addition of an alkali metal such as potassium or, expediently, sodium to the alcohol there can be obtained a solution of the alcoholate in the alcohol (e.g. sodium methylate in methanol) which is eminently suitable as the alkaline, anhydrous medium for the reaction in accordance with the invention.

For the generation of the necessary alkalinity of the reaction medium, apart from alcoholates there also come into consideration other substances which can withdraw protons from the Compound II, for example alkali hydrides such as sodium hydride or alkyl- or arylalkali compounds such as phenyl-lithium.

When using alcoholate/alcohol solutions (e.g. $R_3O^-/R_3OH$ solutions), as a consequence of re-esterification then generally an ester of Formula III which contains as the ester group the alkyl group ($R_3$) of the alcohol ($R_3OH$) used as the solvent is formed as the main product of the process:

Thus, for example, on reaction of an enol ether I with malonic acid dimethyl ester there will result an ester of Formula III with $R_3$=ethyl when the reaction is carried out in an ethylate/ethanol solution.

The reaction may preferably be carried out using equimolar or excess amounts of malonic ester and alkali relative to the enol ether, however, from 1–2 mols of malonic ester and from 1–2.5 mols of alkali per mole of enol ether represent the preferred operating ranges.

The reaction of the enol ether I with the Compound II under the stated reaction conditions is expediently effected by heating the reaction mixture for up to about 100 hours under reflux. It has been found that the reaction velocity is to a certain extent dependent on the steric hindrance exerted by the R-substituents. Thus, for example, the reaction velocity for starting materials with R=methyl is greater than for those with R=n-pentyl. Moreover, the reaction velocity is generally also greater for 5-rings ($n=1$) (up to about 50 hours) than for 6-rings ($n=2$) (up to about 100 hours.) After completion of the reaction, the desired reaction product (i.e. the ester of Formula III) can be isolated in a conventional manner. In so doing, one expediently proceeds as follows: The reaction mixture is cooled and thereupon neutralized, preferably with anhydrous acid. Particularly suitable is anhydrous acetic acid (glacial acetic). However, other acids also come into consideration, such as other carboxylic acid, as well as sulphonic acids and anhydrous mineral acids such as hydrochloric acid, sulphuric acid, phosphoric acid. The desired ester III can be obtained in pure form from the neutralized reaction mixture by extraction and fractional distillation.

The new enol ethers of general Formula I used as starting substances can be obtained from corresponding, normally enolized 1,3-diketones, using known methods, e.g. by etherification with diazomethane in ethereal solution, conveniently at room temperature; under the influence of dimethylsulfate in alkaline medium, conveniently at room temperature; or using methanol and an acid catalyst, e.g. p-toluene-sulfonic acid, at the reflux temperature of the reaction mixture.

The new esters of general Formula III can be used as intermediate products for the manufacture of valuable odorants, especially those of the jasmine series, into which they can be converted by hydrogenation or by saponification and decarboxylation. Thus, for example, [2-(2'-pentynyl)-3-keto-1-cyclopenten-]yl acetic acid metal ester may readily be converted by catalytic hydrogenation (using a Lindlar catalyst) and subsequent hydrogenation of the reaction product (using lithium in ammonia) into the valuable odorant methyl jasmonate, [2-(2'-pentenyl)-3-keto-cyclopent-]yl acetic acid methyl ester; odoriferous principle of jasmine absolute. In an analogous manner, the odorant methyl dihydrojasmonate ([2-pentyl-3-keto-1-cyclopent-]yl acetic acid methyl ester) can be obtained from [2-pentyl-3-keto-1-cyclopenten-]yl acetic acid methyl ester by (preferably catalytic) hydrogenation. Moreover, the odorant dihydrojasmone can be obtained from the said [2-pentyl-3-keto-1-cyclopenten-]yl acetic acid methyl ester by saponification in alkaline-aqueous or acid-aqueous reaction medium followed by decarboxylation.

The foregoing odorants of the jasmine series are well known in the perfumers art and have been used as the odorant factor in perfumes, colognes, powders, soaps and the like in a manner well known to those skilled in the art. (See for example International Compendium of aromatic materials; Hüthig, Heidelberg (1968), pages 359 and 367; Swiss Patents No. 382,731 and 420,455).

Compounds of general Formula III with $n=1$ and R=straight-chain alkyl, alkenyl or alkynyl with 5 C-atoms hence form a particularly preferred group of starting materials.

In the following examples, the temperatures are stated in degrees centigrade.

EXAMPLE I (a) Sodium methylate is manufactured from 3.57 g. of sodium and 125 ml. of dry methanol. 17.0 g. of malonic acid dimethyl ester and 11.5 g. of 3-methoxy-2-(2'-pentynyl)-2-cyclopenten-1-one are than added and the mixture is boiled at reflux for 16 hours. The solution is thereupon cooled and 7.75 g. of glacial acetic are added dropwise below 10°. Most of the methanol is evaporated off, the residue taken up in water and shaken with ether. After drying and evaporation of the ether the crude product still contains malonic acid dimethyl ester. By means of fractional distillation there are obtained 11.15 g. of pure [2-(2'-pentynyl)-3-keto-1-cyclopenten]-yl acetic acid methyl ester of B.P. 150°/0.02 mm. This corresponds to a yield of 79%.

(b) The methyl ester thus obtained can be converted into the valuable odorant methyl jasmonate,[2-(cis-2'-pentyl)-3-ketocyclopent-]yl acetic acid methyl ester as follows:

7.65 g. of the [2-(2'-pentynyl)-3-keto-1-cyclopenten-]yl acetic acid methyl ester in 100 ml. of absolute ethanol are hydrogenated in a conventional manner in the presence of 0.76 g. of Lindlar catalyst (palladium catalyst partially deactivated with lead). The calculated amount of hydrogen has been taken up after 2 hours. The catalyst is filtered off and the solution evaporated. After distillation of the residue, there are obtained 6.75 g. of [2-(cis-2'-pentenyl)-3-keto-1-cyclopenten-]yl acetic acid methyl ester of B.P. 86–88°/0.005 mm. Yield: 88%.

1.46 g. of lithium are dissolved in 500 ml. of dry, distilled ammonia and cooled to −75°. 9.0 g. of the [2-(2'-cispentenyl)-3-keto-1-cyclopentene-]yl acetic acid methyl ester obtained are thereupon added dropwise and the mixture is stirred at −75° for 10 minutes. 11.7 g. of ammonium chloride are then added, the cooling bath is removed and the ammonia is expelled. Water is thereupon added and the mixture shaken with ether in a conventional manner. After distillation there are obtained 4.65 g. of methyl jasmonate of B.P. 130°/0.005 mm.; $n_D^{20}$ 1.4780; Yield: 50%.

(c) The 3-methoxy-2-(2'-pentynyl)-2-cyclopenten-1-one used as the starting material can be obtained as follows:

33.2 g. of sodium bicarbonate are dissolved in 300 ml. of distilled water. To this solution there are added portionwise 17.6 g. of 1,3-cyclopentanedione and 27.75 g. of 2-pentynyl bromide are subsequently added dropwise. The mixture is stirred at 60° for 64 hours. After cooling, the reaction mixture is extracted with ether and the aqueous phase acidified with 7% aqueous hydrochloric acid. 2-2'-pentynylcyclopentane-1,3-dione of M.P. 148–150° is thus obtained. Yield: 37%.

A solution of 16.0 g. of 2-2'-pentynylcyclopentane-1,3-dione in 100 ml. of tetrahydrofuran is treated with an excess of etheral diazomethane solution. After 10 minutes, the solvents are evaporated in vacuum and the residue is distilled. 13.85 g. of 3-methoxy-2-(2'-pentynyl)-2-cyclopenten-1-one of B.P. 142–150°/0.03 mm. are thus obtained. Yield: 80%.

EXAMPLE 2

A sodium methylate solution is manufactured from 2.45 g. of sodium and 60 ml. of dry methanol. 138 g. of malonic acid dimethyl ester are then added and subsequently 6.6 g. of 3-methoxy-2-methyl-2-cyclopenten-1-one are added portionwise as solid substance. After 3 hours boiling at reflux, 6.3 g. of glacial acetic are added dropwise below 10° to the cooled mixture. Most of the methanol is evaporated off in vacuum and the residue treated with 250 ml. of ether. The precipitated sodium acetate is filtered off and the filtrate concentrated. By fractional distillation there are recovered 5.9 g. of pure [2-methyl-3-keto-1-cyclopentene]yl-acetic acid methyl ester of B.P. 72–780/0.02 mm. This corresponds to a yield of 70%.

EXAMPLE 3

A sodium methylate solution is manufactured from 25 g. of sodium and 700 ml. of dry methanol. 132 g. of malonic acid dimethyl ester and 150 g. of 3-methoxy-2-pentyl-2-cyclopenten-1-one are added and the mixture is boiled at reflux for 25 hours. 68 g. of glacial acetic are added dropwise below 10° to the cooled mixture. Most of the methanol is evaporated off, the residue diluted with 1 litre of distilled water and shaken twice with 300 ml. of ether each time. The etherical solution is washed with water, the ether distilled off and the residue fractionated. 165 g. of [2-pentyl-3-keto-1-cyclopenten]yl acetic acid methyl ester of B.P. 120–123°/0.1 mm. are obtained. Yield 91%.

The product obtained can be converted into methyl dihydrojasmonate ([2-pentyl-3-keto-1-cyclopent]yl acetic acid methyl ester) as follows:

150 g. of [2-pentyl-3-keto-1-cyclopenten]yl acetic acid methyl ester in 300 ml. of ethanol are hydrogenated in the presence of 5 g. of palladium-charcoal (5%). The usual working up yields methyl dihydrojasmonate (B.P. 98–100°/0.8 mm.; $n_D^{20}=1.4604$).

EXAMPLE 4

Sodium methylate is manufactured from 17 g. of sodium and 500 ml. of dry methanol. 89.3 g. of malonic acid dimethyl ester and 65.3 g. of 3-methoxy-2-hexyl-2-cyclopenten-1-one are then added and boiled at reflux for 40 hours. The mixture is cooled and 43.3 g. of glacial acetic are added dropwise below 10° in order to neutralize the mixture. Most of the methanol is evaporated off, the residue taken up in water and shaken with ether. The crude product still contains malonic acid dimethyl ester after evaporation of the ether. By fractional distillation there are obtained 76.1 g. of [2-hexyl-3-keto-1-cyclopenten]yl acetic acid methyl ester of B.P. 109–112°/0.22 mm.; $n_D^{20}=1.4827$; yield 90% (purity ca. 98%).

EXAMPLE 5

A sodium methylate solution is manufactured from 7.7 g. of sodium and 200 ml. of dry methanol. 40 g. of malonic acid dimethyl ester and 24 g. of 3-methoxy-2-allyl-2-cyclohexen-1-one are added and boiled at reflux for 72 hours. The mixture is thereupon cooled and 20 g. of acetic acid are added dropwise below 10°. Most of the methanol is evaporated off, the residue taken up in water. The mixture is extracted twice with ether and the ether solutions are washed with water. The ether solution (ca. 500 ml.)

is intensively mixed with 200 ml. of 1-N aqueous hydrochloric acid solution using a vibro-mixer for 25 minutes. The aqueous phase is separated off; the ether phase is first washed with brine, then with saturated sodium bicarbonate solution and finally again with brine. The ether solution is dried and evaporated. By distillation there are obtained 20.2 g. of [2-allyl-3-keto-1-cyclohexen]yl acetic acid methyl ester of B.P. 94–97°/0.2 mm. Yield: 67%.

EXAMPLE 6

Sodium methylate is manufactured from 7.9 g. of sodium and 230 g. of dry methanol. 41.3 g. of malonic acid dimethyl ester are then rapidly added and stirred for 30 minutes. 62 g. of methoxy-2-octyl-2-cyclopenten-1-one are added and the mixture is held at reflux for 45 hours. The mixture is thereupon cooled and 21.4 g. of glacial acetic are added. Most of the methanol is evaporated off in vacuum, the residue is taken up in ca 300 ml. of water and the solution is shaken with ether (twice with 150 ml. each time). The ethereal solution is washed with water, the ether evaporated off and the residue fractionated in a column. There are obtained 58.0 g. of [2-octyl-3-keto-1-cyclopenten]yl acetic acid methyl ester of boiling point 150°/0.02 mm. Hg. This corresponds to a yield of 84%.

EXAMPLE 7

A sodium methylate solution is manufactured from 2.45 g. of sodium and 60 ml. of dry methanol. 13.8 g. of malonic acid dimethyl ester in 10 ml. of dry methanol and 5.6 g. of 3-methoxy-2-cyclopenten-1-one are added and the mixture is held at reflux for 5 hours. 6.3 g. of glacial acetic are added dropwise below 20° to the cooled mixture. Most of the methanol is evaporated off and the precipitated sodium acetate separated off by filtration. The filtrate is concentrated and fractionated. There are obtained 5.0 g. of oil of boiling point 96–132°/0.1 mm. which essentially represents a mixture of [3-keto-1-cyclopenten-]yl malonic acid dimethyl ester and [3-keto-1-cyclopenten-]yl acetic acid methyl ester. Pure [3-keto-1-cyclopenten]yl acetic acid methyl ester was isolated from a fraction of boiling point 96°/0.1 mm. using preparative gas-chromatography. Pure [3-keto-1-cyclopenten]yl malonic acid dimethyl ester was isolated from a fraction of boiling point 107–132°/0.1 mm. in the same manner. Spectra and combustion analysis are well consistent with the postulated structures.

EXAMPLE 8

A solution of sodium methylate is prepared from 245 mg. of sodium and 7 ml. of dry methanol. After the addition of 1.35 g. of dimethyl malonate the resulting mixture is stirred for 30 minutes. 1.2 g. of 3-methoxy-2-allyl-2-cyclopenten-1-one are then added and the mixture is refluxed for 24 hours. The product is cooled. 0.67 g. of glacial acetic acid are then added dropwise with continued ice-cooling. The product is diluted with ethyl ether and washed twice with brine. The ether solution is then dried and evaporated. Distillation of the product in a "Kugelrohr" gives 2-allyl-3-keto-cyclopenten-1-yl methyl acetate. B.P. 115–150°/0.04 mm. (air bath).

EXAMPLE 9

56 gms. of 2-methyl-2-cyclopentene-1,3-dione are dissolved in 100 ml. of dry ether and an ethereal solution of diazomethene are added thereto at ambient temperature until the solution acquires a permanent pale yellow color. The reaction mixture is then evaporated to yield 3-methoxy-2-methyl-3-cyclopenten-1-one. The product may be further purified by distillation under reduced pressure.

In accordance with the above procedure but starting with 2-pentyl-2-cyclopentene-1,3-dione, 2-hexyl-2-cyclopentene-1,3-dione and 2-cyclopentene-1,3-dione in place of 2-methyl-2-cyclopentene-1,3-dione, there is obtained the corresponding 3-methoxy-2-pentyl-2-cyclopenten-1-one, 3-methoxy-2-hexyl-2-cyclopenten-1-one and 3-methoxy-2-cyclopenten-1-one respectively.

EXAMPLE 10

77 gms. of 2-allyl-2-cyclohexene-1,3-dione are stirred, with 21 g. of sodium hydroxide in 200 ml. of water. The mixture is cooled in an ice bath and 63 g. of dimethyl sulphate added dropwise for one hour with vigorous stirring.

The mixture is then heated under reflux for 2 hours, cooled diluted with 200 ml. of water and 200 ml. of ether and the ether layer washed first with dilute sulphuric acid and then with water to neutrality. The ether layer is then dried, filtered and evaporated to yield 3-methoxy-2-allyl-2-cyclohexen-1-one.

In accordance with the above procedure, but starting with 2 - (2' - pentynyl) - 2 - cyclopentene - 1,3-dione or 2-octyl-2-cyclopentene-1,3-dione in place of 2-allyl-2-cyclohexene-1,3-dione there is obtained the corresponding 2 - methoxy - 2 - (2' - pentynyl) - 2 - cyclopenten-1-one and 3-methoxy - 2 - octyl - 2 - cyclopenten-1-one respectively.

In accordance with the above procedure; but using diethyl sulphate, dipropyl sulphate or dibutyl sulphate in place of dimethyl sulphate with 2-allyl-2-cyclohexene-1, 3-dione, there are obtained the corresponding 3-ethoxy-, 3-propoxy-, and 3-butoxy-2-allyl-2-cyclohexen-1-one.

What is claimed is:

1. Cycloalkenone esters of the general formula

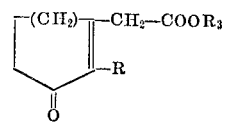

wherein R is a hydrogen atom, lower alkyl, lower alkenyl or lower alkynyl, and $R_3$ is a lower alkyl group.

2. 2 - [2' - pentynyl] - 3 - keto-1-cyclopenten-yl acetic acid methyl ester, being a compound of claim 1.

3. [2 - (cis - 2' - pentenyl)-3-keto-1-cyclopenten]-yl-acetic acid methyl ester, being a compound of claim 1.

4. [2 - methyl - 3 - keto - 1 - cyclopenten-]yl acetic acid methyl ester, being a compound of claim 1.

5. [2 - pentyl - 3 - keto - 1 - cyclopenten - ]yl acetic acid methyl ester, being a compound of claim 1.

6. [2 - hexyl - 3 - keto - 1 - cyclopenten - ]yl acetic acid methyl ester, being a compound of claim 1.

7. [2 - allyl - 3 - keto - 1 - cyclopenten-]yl acetic acid methyl ester, being a compound of claim 1.

8. [2-octyl-3-keto-1-cyclopenten-]yl acetic acid methyl ester, being a compound of claim 1.

9. [3-keto-cyclopenten-]yl acetic acid methyl ester, being a compound of claim 1.

10. [2-allyl-3-keto-1-cyclohexen-]yl acetic acid methyl ester.

References Cited

UNITED STATES PATENTS 3,158,644  11/1964  Demole et al. _____ 260—468
3,288,833  11/1966  Demole _____ 260—468

OTHER REFERENCES

Davis et al., J. Chem. Soc., 4212 (1961).
Cronyn et al. J. Am. Chem. Soc., 74, 3331 (1952).
Tanaka, Jap. Chem. Soc. Bull. 40, 233 (1967).
Corrall et al., J. Sc. Fd. Agric., 16, 514 (1965).
Smith: Dissertation Abstracts 22, 3411 (1962).

LORRAINE A. WEINBERGER, Primary Examiner

R. GERSTL, Assistant Examiner

U. S. Cl. X.R.

252—522; 260—514 K, 586 R